(12) United States Patent
Kim

(10) Patent No.: US 6,591,212 B2
(45) Date of Patent: Jul. 8, 2003

(54) METHOD FOR TESTING CONTINUITY OF ISUP RELAY CALL

(75) Inventor: Hwa Sung Kim, Inchon (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 09/725,136

(22) Filed: Nov. 29, 2000

(65) Prior Publication Data

US 2001/0002191 A1 May 31, 2001

(30) Foreign Application Priority Data

Nov. 30, 1999 (KR) .......................... 1999-53910

(51) Int. Cl.[7] ................................................ H04Q 7/12
(52) U.S. Cl. ...................................... 702/118; 455/428
(58) Field of Search ................................ 702/118, 122, 702/103, 39, 35, 36, 58, 59, 81, 84, 182, 183, 184, 185; 455/423, 428, 445, 78, 226.1, 226.2; 340/3.43, 3.44, 286.02, 652

(56) References Cited

U.S. PATENT DOCUMENTS

| 4,119,805 A | * | 10/1978 | Pratelli ........................ 379/244 |
| 5,343,461 A | * | 8/1994 | Barton et al. ................. 370/249 |
| 5,353,327 A | * | 10/1994 | Adari et al. .................... 379/22 |
| 5,442,692 A | * | 8/1995 | Yamazaki et al. ............ 379/253 |
| 5,887,051 A | * | 3/1999 | Sullivan et al. ................ 379/21 |
| 5,926,764 A | * | 7/1999 | Sarpola et al. ............... 455/450 |
| 6,088,588 A | * | 7/2000 | Osborne ....................... 455/425 |
| 6,178,170 B1 | * | 1/2001 | Duree et al. ............. 370/395.61 |
| 6,308,060 B2 | * | 10/2001 | Wortham ...................... 455/414 |
| 6,442,169 B1 | * | 8/2002 | Lewis .......................... 370/401 |

* cited by examiner

Primary Examiner—Marc S. Hoff
Assistant Examiner—Edward Raymond
(74) Attorney, Agent, or Firm—Fleshner & Kim, LLP

(57) ABSTRACT

A method for testing continuity of an ISUP relay call in an ISUP network consisting of a proceeding switching system and a following switching system, in which, in setting up a call, a preceding switching system transmits a call set-up message, that is, an initial address message (IAM), for continuity testing to a following switching system and at the same time forms a communication path loop, and upon receipt of the IAM, the following switching system transmits a testing sound to the communication loop to test continuity of the communication path.

16 Claims, 4 Drawing Sheets

METHOD FOR TESTING CONTINUITY OF ISUP RELAY CALL

BACKGROUND OF THE INVENTION

1. Field of the Invention

The present invention relates to an ISUP (ISDN User Part) network, and more particularly to a method for testing continuity of ISUP relay call.

2. Description of the Background Art

FIG. 1 is a schematic view of an ISUP network in accordance with a conventional art.

As shown in the drawing, a preceding switching system 11 generates a continuity testing message, that is, a initial address message (IAM), and a testing sound to check continuity of a communication path, and a following switching system 12 forms a communication path loop and performs a function to request a call set-up according to the continuity checking result transmitted from the preceding switching system 11.

The method for testing continuity of an ISUP relay call in an ISUP network constructed as described above will now be explained with reference to the accompanying drawings.

In setting up a call, the preceding switching system 11 judges whether a continuity testing is to be performed for a corresponding relay line, on the basis of the usual state of relay lines.

If it is judged to need a continuity testing for a corresponding relay line, as shown in FIG. 2, the preceding switching system 11 sets the value of a connection characteristic indicating parameter of the initial address message (IAM) (that is, a call set-up message), that is, it sets a continuity testing indicating field as a continuity testing required value, and transmits the IAM to the following switching system 12.

Upon receiving the IAM from the preceding switching system 11, the following switching system 12 forms a communication path loop 12-1 to perform a continuity testing.

After a predetermined time elapses, that is, after a sufficient time during which the following switching system 12 sets a communication path loop 12-1 upon receipt of the IAM elapses, the preceding switching system 11 transmits the testing sound generated by a sound source. When the testing sound is completely transmitted, the preceding switching system stops transmitting the testing sound.

Subsequently, the preceding switching system 11 measures a reflected sound returned through the communication path to check the state of the communication path, and transmits a continuity (COT) message carrying the communication path checking result to the following switching system 12.

Then, the following switching center 12 releases the communication path loop 12-1 and then continues or discontinues a call according to the COT message transmitted from the preceding switching system 11.

In other words, in case that the communication path is in a good condition, the following switching system 12 requests a call set-up, whereas, in case that the communication path is in a bad condition, the following switching system 12 transmits a release (REL) message to the preceding switching system and releases a call.

As described above, in the method for testing continuity for an ISUP relay call in accordance with the conventional art, the testing sound transmission and the continuity testing of the communication path are all performed by the preceding switching system.

However, the preceding switching system transmits the testing sound to the following switching system after a predetermined time sufficient for setting up a communication path loop elapses after the following switching system receives the IAM. Thus, the preceding switching system waits for a considerably long time to transmits a testing sound, resulting in that a long time is consumed to set up a call.

In addition, since the following switching system does not set up a call until it receives the continuity result message (COT) from the preceding switching system, call set-up delay occurs in the following switching system.

Moreover, since the preceding switching system should transmit the message indicating continuity testing to the following switching system, an additional load factor is caused in the preceding switching system.

SUMMARY OF THE INVENTION

Therefore, an object of the present invention is to provide a method for testing continuity of an ISUP relay call which is capable of reducing a load in a preceding switching system and shortening time for setting up a call in a following switching system by performing testing sound transmission and continuity testing in the following switching system.

To achieve these and other advantages and in accordance with the purpose of the present invention, as embodied and broadly described herein, there is provided a method for testing continuity of an ISUP relay call, in which, in setting up a call, a preceding switching system transmits a call set-up message, that is, an initial address message (IAM), for continuity testing to a following switching system and at the same time forms a communication path loop, and upon receipt of the IAM, the following switching system transmits a testing sound to the communication loop to test continuity of the communication path.

To achieve the above objects, there is also provided a method for testing continuity of an ISUP relay call, including the steps of: receiving a call set-up message (IAM) from a preceding switching system; identifying the received IAM to judge whether a continuity testing is to be performed; generating and transmitting a testing sound to a communication path loop in case that a continuity testing is to be performed upon judgement; and identifying the state of the communication path on the basis of the testing sound reflected from the communication path loop and controlling setting up of a call.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
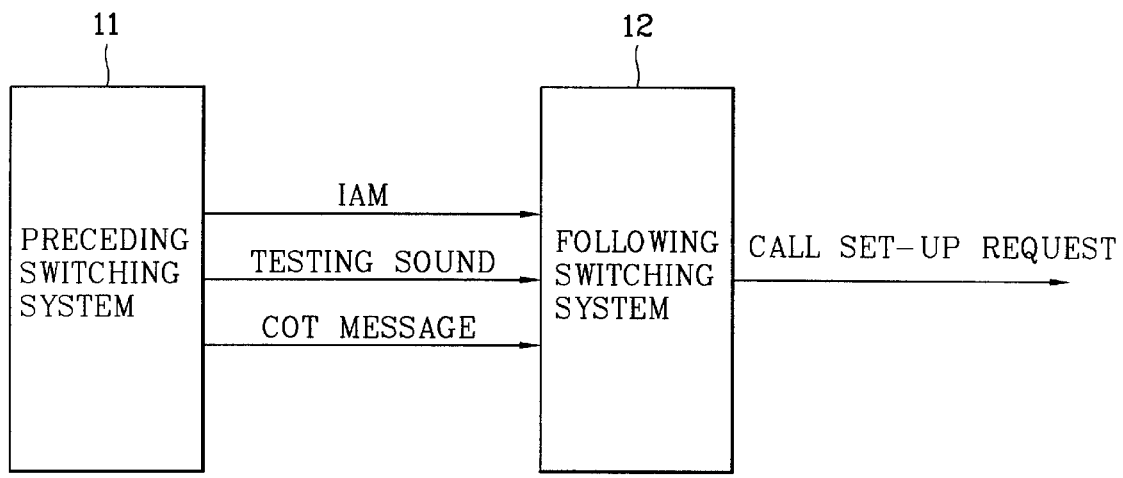
FIG. 1 is a schematic view showing an ISUP network in accordance with a conventional art.
Figure 2:
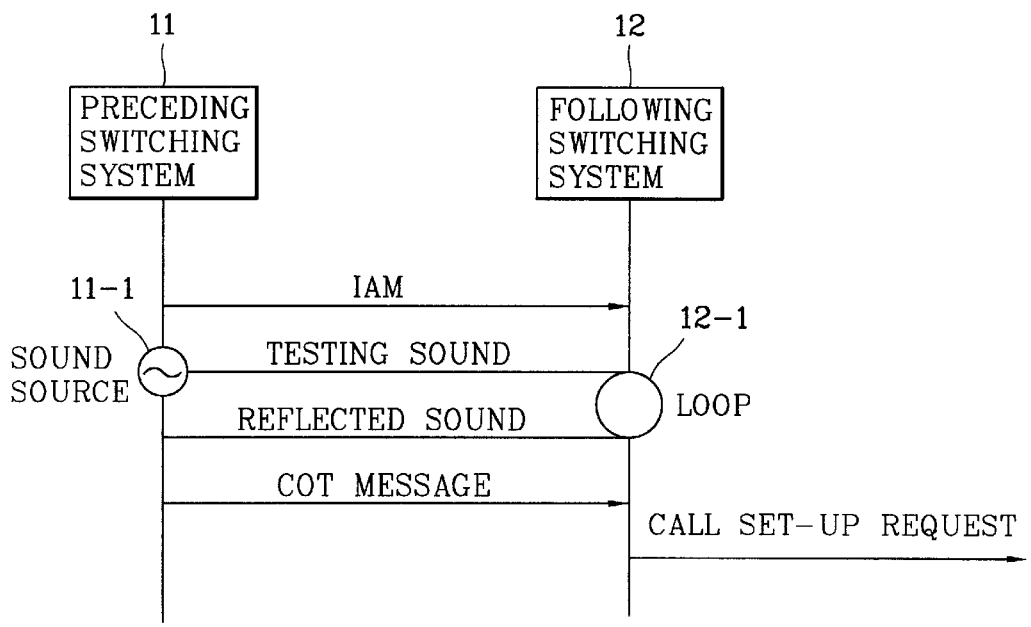
FIG. 2 illustrates signals transmitted between a preceding switching system and a following switching system for continuity testing of FIG. 1 in accordance with the conventional art.
Figure 3:
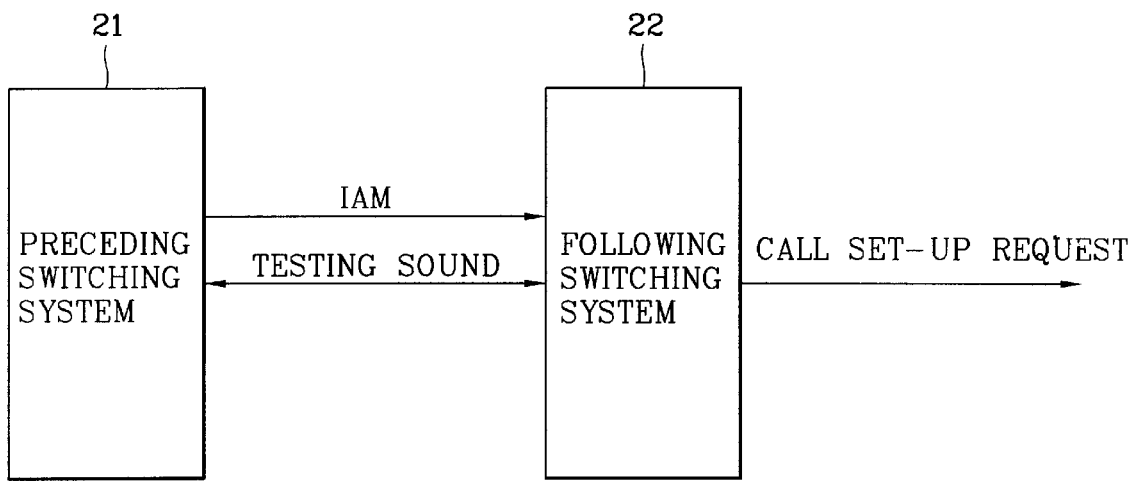
FIG. 3 is a schematic view showing an ISUP network in accordance with the present invention.

FIG. 3 is a schematic view showing an ISUP network in accordance with the present invention.

As shown in the drawing, the preceding switching system 21 serves to transmit a call set-up message (IAM) for continuity testing to a following switching system 22 and form a communication path loop, and the following switching system 22 serves to generate a testing sound, test continuity of the communication path according to the received IAM and set up a call.

The method for testing continuity of an ISUP relay call of the present invention constructed as described above will now be explained with reference to the accompanying drawings.

Figure 4:
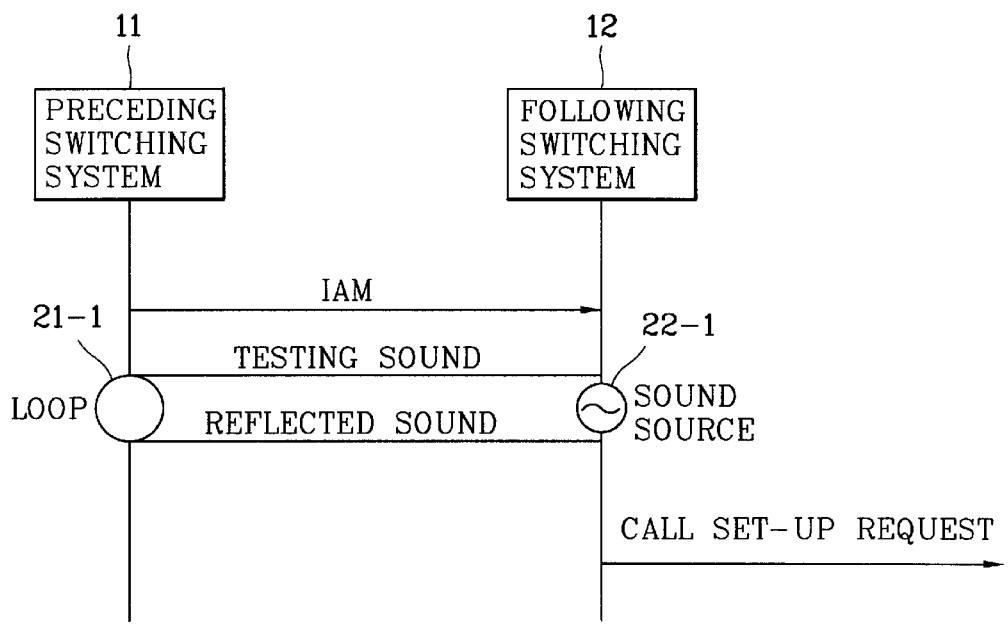
FIG. 4 illustrates signals transmitted between a preceding switching system and a following switching system for continuity testing of FIG. 3 in accordance with the present invention.

FIG. 4 illustrates signals transmitted between a preceding switching system and a following switching system for continuity testing of FIG. 3 in accordance with the present invention.

As shown in the drawing, the preceding switching system 21 transmits the call set-up message (IAM) to the following switching system 22 to request a continuity testing and forms a communication path loop 2101 so as for the following switching system 22 to perform a continuity testing.

After the following switching system 22 confirms the received IAM, it transmits a testing sound generated by a sound source 22-1 to the communication path, identifies the testing sound reflected from the communication path, to thereby discriminates the state of the communication path.

Figure 5A:
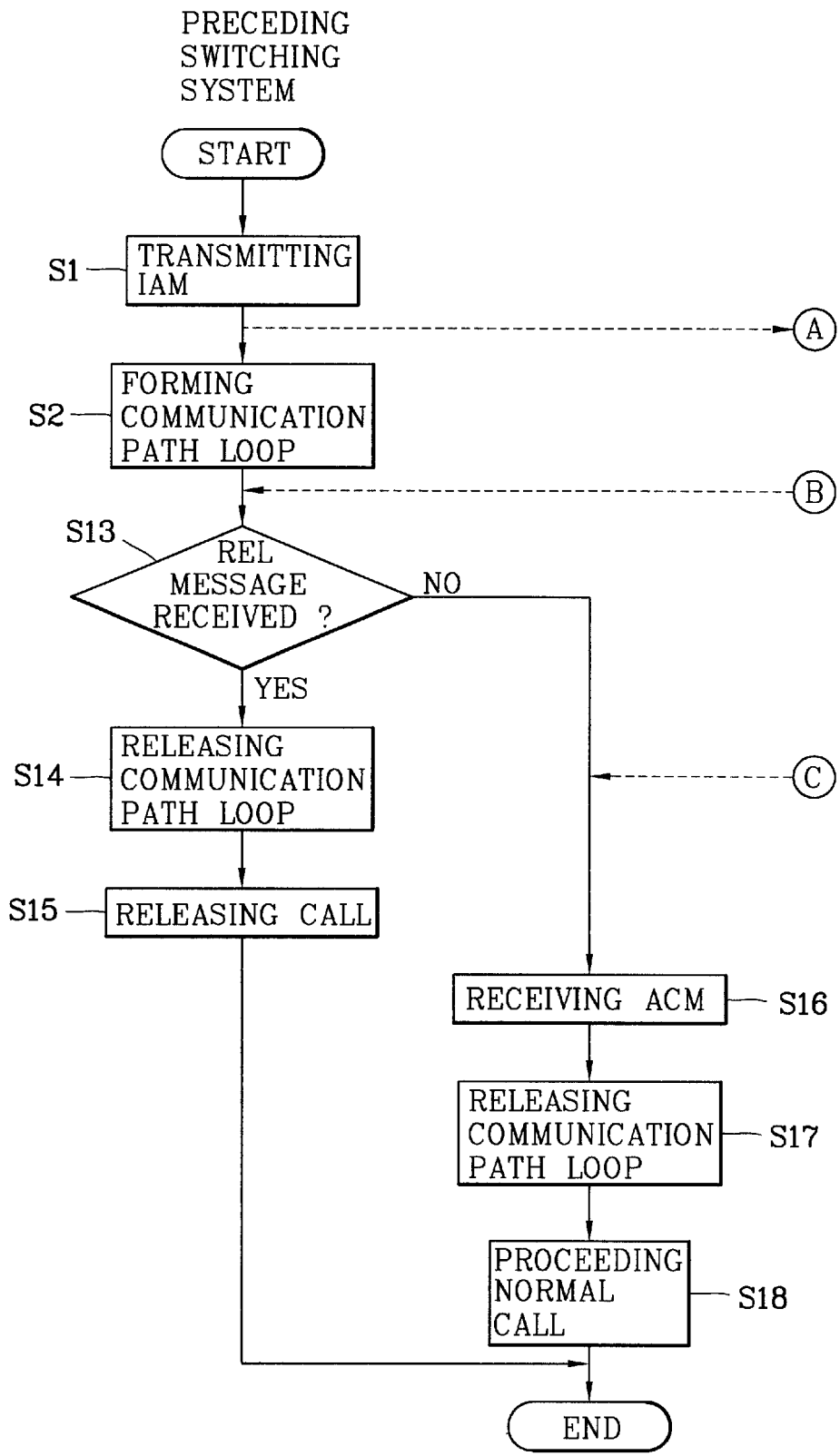
FIG. 5 is a flow chart for testing continuity of an ISUP relay call of FIG. 3 in accordance with the present invention.
Figure 5B:
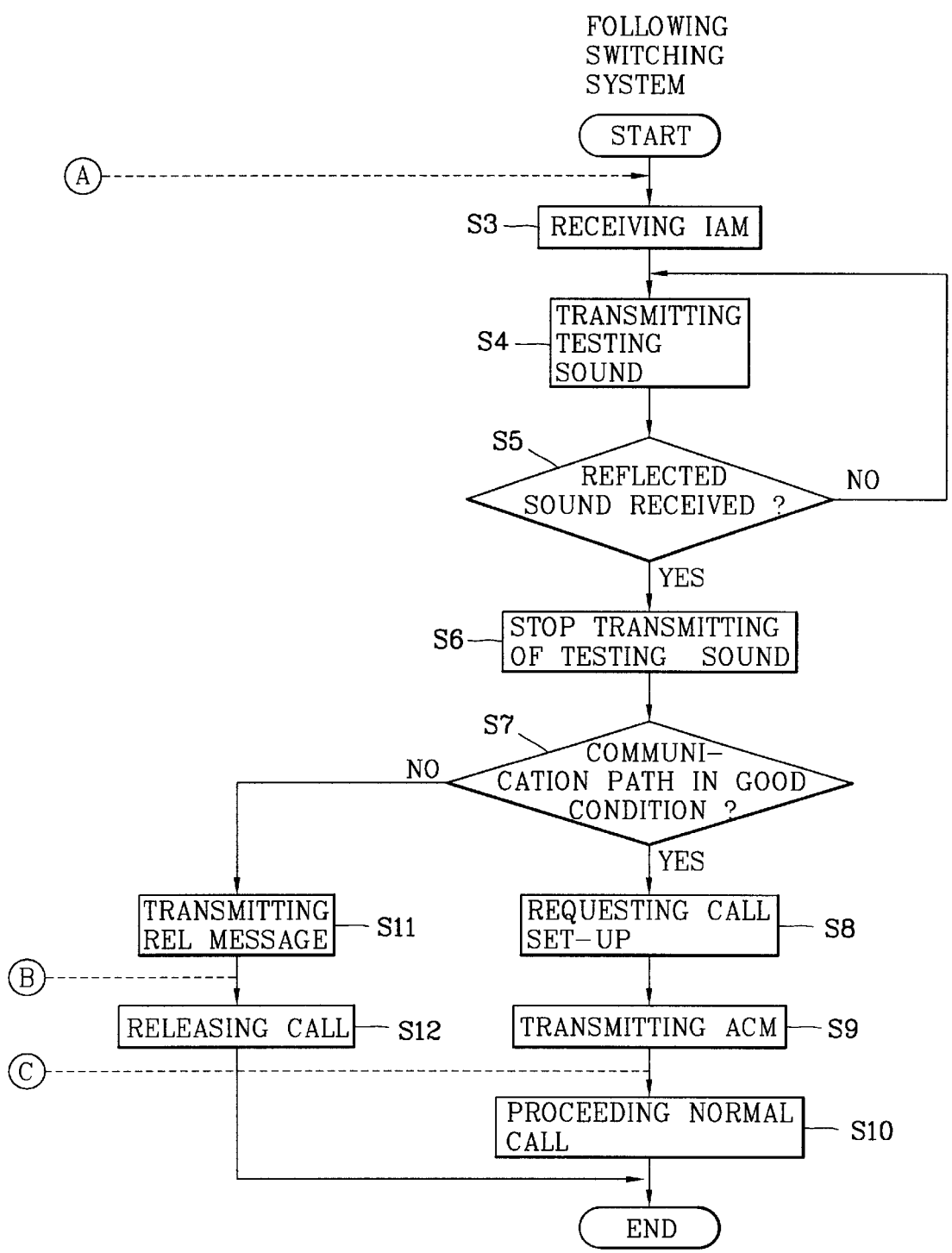

The above operating will now be described in detail with reference to the flow chart of FIG. 5.

In setting up a call, the preceding switching system 21 judges whether a continuity testing is required for a relay line. Upon judgement, if a continuity testing is required for a corresponding relay line, the preceding switching system 21 transmits a call set-up message (IAM) to the following switching system 22 to request a continuity testing (S1), and at the same time, forms a communication path loop 21-1 so as for the following switching system to perform a continuity testing (S2) therethrough. In other words, the preceding switching system 21 indicates a CCT (Continuity Check Test) in a continuity testing indicating field of a connection characteristic indicating parameter of the call set-up message (IAM) and transmits it to the following switching system 22.

Then, the following switching system 22 checks the continuity testing indicating field of the connection characteristic indicating parameter of the IAM as received to identify whether a continuity testing is required to be performed, and transmits the testing sound generated from the sound source 22-1 to the communication path (S3) (S4). At this time, the testing sound is reflected back to the following switching system 22 through the communication path loop.

As the following switching system 22 receives the reflected testing sound, that is, the reflected sound, it blocks the sound source 22-1 from the communication path to discontinue transmitting of the testing sound (S5) (S6) and identifies the sound reflected from the communication path to judge whether the communication path is in a good condition (S7).

Upon judgement, in case that the communication is in a good condition, the following switching system 22 requests the preceding switching system 21 to set up a call and transmits an ACM (Address Complete Message) to the preceding switching system 21, thereby proceeding a normal call (S8~S10).

Meanwhile, in case that the communication is in a bad condition, the following switching system 22 transmits the REL (Release) message to the preceding switching system 21 and then performs a call release procedure (S11) (S12).

Accordingly, the preceding switching system 21 checks whether the REL message has been received (S13), and if the REL message has been received due to a bad condition of the communication path, the preceding switching system 21 releases the communication path loop 21-1 and the call (S14) (S15).

Meanwhile, in case that a REL message has not been received, the preceding switching system 21 releases the communication path loop 21-1 as the ACM is received from the following switching system 22, and proceeds a normal call (S16~S18).

In this way, the present invention employs the following switching system-centered continuity testing method in which the following switching system transmits the testing sound and judges whether a continuity testing is successfully performed, so that messages to be transmitted between switching systems are reduced in number and the time consumed for setting up a call can be reduced.

As so far described, according to the method for testing continuity of an ISUP relay call of the present invention, the preceding switching system serves to form only the communication path loop while the following switching system serves to perform transmission of the testing sound and the continuity testing, so that the testing sound can be transmitted at an accurate time point, and especially, the time required for the continuity testing can be minimized.

In addition, since the following switching system performs the continuity testing, the following switching system does not need to receive the continuity result message (COT) from the preceding switching system as does in the conventional art. Accordingly, the preceding switching system can reduce the load in processing the COT message, and the following switching system can reduce such a standby time for the COT message as in the conventional art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for testing continuity of an ISUP relay call in an ISUP network comprising a preceding switching system and a following switching system, wherein, in setting up a call, the preceding switching system transmits a call set-up message, via an initial address message (IAM), for continuity testing to a following switching system and at the same time forms a communication path loop, and upon receipt of the IAM, the following switching system transmits a testing sound to the communication loop to test continuity of the communication path.

2. The method according to claim 1, wherein, when the preceding switching system judges that a continuity testing is to be performed, the preceding switching system indicates Continuity Check Test (CCT) in a continuity testing indicating field of a connection characteristic indicating parameter of the IAM.

3. The method according to claim 1, wherein when the following switching system receives a reflected sound, it stops transmitting of the testing sound.

4. The method according to claim 1, wherein in case that the communication path is in a good condition, the following switching system transmits an Address Complete Message (ACM) to the preceding switching system and proceeds a normal call set-up.

5. The method according to claim 1, wherein in case that the communication path is in a bad condition, the following switching system generates a release message, transmits it to the preceding switching system and discontinues setting up of a call.

6. A method for testing continuity of an ISUP relay call, comprising the steps of:

receiving a call set-up message (IAM) from a preceding switching system;

identifying the received IAM and judging whether a continuity testing is to be performed;

generating and transmitting a testing sound through a communication path loop in case that a continuity testing is to be performed upon judgement; and identifying the state of the communication path on the basis of the testing sound reflected from the communication path loop and controlling setting up of a call.

7. The method according to claim 6, wherein the preceding switching system transmits the IAM for a continuity testing to the following switching system and forms a communication path loop.

8. The method according to claim 6, wherein the following switching system judges whether a continuity testing is to be performed on the basis of the continuity testing indicating field value of the connection characteristic indicating parameter of the IAM.

9. The method according to claim 6, wherein when the following switching system receives the reflected sound, it discontinues transmitting of the testing sound.

10. The method according to claim 6, wherein the step of controlling setting up of a call comprising sub-steps of:

identifying the state of the communication path on the basis of the reflected testing sound;

transmitting the Address Complete Message (ACM) to the preceding switching system and proceeding to set up a call normally, in case that the communication path is in a good condition; and transmitting a REL (Release) message to the preceding switching system and discontinuing setting up of a call, in case that the communication path is in a bad condition.

11. The method according to claim 10, wherein the preceding switching system releases the communication path loop and a call in case that the REL message is received thereto, while, when the preceding switching system releases the communication path loop and proceeds a normal call in case that the ACM is received thereto.

12. A method for testing continuity of an ISUP relay call, comprising the steps of:

receiving an IAM from a preceding switching system and identifying whether a continuity testing is to be performed;

transmitting a testing sound to a communication path loop in case that a continuity testing is to be performed;

identifying the state of the communication path on the basis of a testing sound reflected from the communication path and controlling setting up of a call, of which the step of controlling setting up of a call comprising the sub-steps of:

identifying the reflected sound to check the state of the communication path;

transmitting the Address Complete Message (ACM) to the preceding switching system and proceeding to set up a call normally, in case that the communication path is in a good condition; and transmitting a REL (Release) message to the preceding switching system and discontinuing setting up of a call, in case that the communication path is in a bad condition.

13. The method according to claim 12, wherein the preceding switching system transmits the IAM for a continuity testing to the following switching system, and at the same time, forms the communication path loop.

14. The method according to claim 12, wherein the following switching system judges whether a continuity testing is to be performed on the basis of the continuity testing indicating field value of the connection characteristic indicating parameter of the IAM.

15. The method according to claim 12, wherein when the following switching system receives the reflected sound, it discontinues transmitting of the testing sound.

16. The method according to claim 10, wherein the preceding switching system releases the communication path loop and a call in case that the REL message is received thereto, while, when the preceding switching system releases the communication path loop and proceeds a normal call in case that the ACM is received thereto.

* * * * *